US010981476B2

United States Patent
Kim et al.

(10) Patent No.: US 10,981,476 B2
(45) Date of Patent: Apr. 20, 2021

(54) VENTILATION APPARATUS FOR SEAT OF VEHICLE AND VARIABLE TYPE VENTILATION SEAT USING SAME

(71) Applicant: HYUNDAI TRANSYS INCORPORATED, Seosan-si (KR)

(72) Inventors: Do Hyung Kim, Yongin-si (KR); Ho Sub Lim, Seoul (KR)

(73) Assignee: HYUNDAI TRANSYSINCORPORATED, Seosan-si (KR)

( * ) Notice: Subject to any disclaimer, the term of this patent is extended or adjusted under 35 U.S.C. 154(b) by 32 days.

(21) Appl. No.: 16/509,014

(22) Filed: Jul. 11, 2019

(65) Prior Publication Data

US 2020/0031258 A1    Jan. 30, 2020

(30) Foreign Application Priority Data

Jul. 27, 2018  (KR) ........................ 10-2018-0087944

(51) Int. Cl.
*B60N 2/56* (2006.01)
(52) U.S. Cl.
CPC ......... *B60N 2/5657* (2013.01); *B60N 2/5642* (2013.01)
(58) Field of Classification Search
None
See application file for complete search history.

(56) References Cited

U.S. PATENT DOCUMENTS

| | | | | |
|---|---|---|---|---|
| 3,568,412 A | * | 3/1971 | Schwab | B01D 46/02 96/423 |
| 4,671,567 A | * | 6/1987 | Frobose | A47C 15/004 297/452.42 |
| 5,082,326 A | * | 1/1992 | Sekido | B60N 2/914 297/284.6 |
| 5,711,575 A | * | 1/1998 | Hand | A47C 7/425 297/284.6 |
| 6,003,950 A | * | 12/1999 | Larsson | A47C 7/74 297/452.42 |
| 6,048,024 A | * | 4/2000 | Wallman | A47C 7/74 297/180.14 |
| 7,261,372 B2 | * | 8/2007 | Aoki | B60N 2/5657 297/180.14 |
| 7,559,610 B1 | * | 7/2009 | Hong Min | A47C 7/744 297/180.1 |

(Continued)

FOREIGN PATENT DOCUMENTS

JP      H0814490 A      1/1996
JP      2001327362      11/2001

(Continued)

Primary Examiner — David R Dunn
Assistant Examiner — Christopher E Veraa
(74) *Attorney, Agent, or Firm* — Burris Law, PLLC

(57) ABSTRACT

A ventilation apparatus for a seat of a vehicle includes: a main duct configured such that a first end thereof is connected to a blower and a second end thereof is coupled to a seat frame so as to allow air to flow therebetween; and a connecting duct configured such that a first end thereof is connected to the second end of the main duct and a second end thereof is connected to a seat pad, and formed in a bellows shape having a variable length so as to allow air to flow between the seat frame and the seat pad even if a spacing distance between the seat frame and the seat pad is changed.

12 Claims, 10 Drawing Sheets

210(211,212,213,214,215)
220(221,222,223)

(56) References Cited

U.S. PATENT DOCUMENTS

| | | | |
|---|---|---|---|
| 7,607,739 B2* | 10/2009 | Browne | B60N 2/5621 |
| | | | 297/180.1 |
| 7,862,113 B2* | 1/2011 | Knoll | B60N 2/5657 |
| | | | 297/180.14 |
| 2007/0210535 A1* | 9/2007 | Inagaki | F16J 3/041 |
| | | | 277/635 |
| 2013/0020841 A1* | 1/2013 | Oota | B60N 2/7094 |
| | | | 297/180.1 |
| 2014/0333107 A1* | 11/2014 | Seki | B60N 2/914 |
| | | | 297/284.1 |

FOREIGN PATENT DOCUMENTS

| | | |
|---|---|---|
| KR | 100805475 | 2/2008 |
| KR | 20-0471712 | 3/2014 |
| KR | 1020170064015 | 6/2017 |

* cited by examiner

10(11,12)
20(21,22)
120(121,122)

VENTILATION APPARATUS FOR SEAT OF VEHICLE AND VARIABLE TYPE VENTILATION SEAT USING SAME

CROSS-REFERENCE TO RELATED APPLICATIONS

This application claims priority to and the benefit of KR 10-2018-0087944, filed on Jul. 27, 2018. The disclosures of the above application is incorporated herein by reference.

FIELD

The present disclosure relates to a ventilation apparatus for a seat of a vehicle and a variable type ventilation seat using the same. More particularly, the present disclosure relates to a ventilation apparatus for a seat of a vehicle and a variable type ventilation seat using the same, in which air is allowed to flow to a seat to provide comfort to an occupant.

BACKGROUND

The statements in this section merely provide background information related to the present disclosure and may not constitute prior art.

Various techniques are applied to a seat of a vehicle to provide a comfortable environment since an occupant often sits on the seat for a long time.

Accordingly, the use of a vehicle seat with a ventilation system that enhances occupant comfort by blowing air or absorbing air has been increased.

The ventilation seat communicates with a blower and a seat pad, and blows or sucks air from the blower to form air flow on a contact surface between an occupant and the seat.

Meanwhile, among the convenience functions of the seat, a movable system for adjusting the posture, position, height, etc. of the seat can be applied. Here, if a gap between the seat pad and the seat frame is variable, it is difficult to maintain sealing of a duct connecting the blower and the seat pad of the ventilation seat. To solve this, method of connecting the duct and the seat pad using rubber bellows has been considered, but many connector structures are required to connect the rubber bellows, and the thickness of the rubber bellows itself is too thick, which leads to an excessively large layout of the seat.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above occurring in the related art, and the present disclosure is intended to propose a ventilation apparatus for a seat of a vehicle and a variable type ventilation seat using the same, in which even if a gap between a seat pad and a seat frame is changed, it is possible to maintain sealing therebetween and the volume of the ventilation apparatus is reduced when compressed.

In order to achieve the above, according to one aspect of the present disclosure, there is provided a ventilation apparatus for a seat of a vehicle, the ventilation apparatus including: a main duct configured such that a first end thereof is connected to a blower and a second end thereof is coupled to a seat frame so as to allow air to flow therebetween; and a connecting duct configured such that a first end thereof is connected to the second end of the main duct and a second end thereof is connected to a seat pad, and formed in a bellows shape having a variable length so as to allow air to flow between the seat frame and the seat pad even if a spacing distance between the seat frame and the seat pad is changed.

The ventilation apparatus may further include a connector configured such that a central portion thereof is formed with a through-hole, a peripheral portion thereof is coupled to the seat frame, and a first side thereof is fastened with the second end of the main duct such that the main duct is fastened to the seat frame, wherein the first end of the connecting duct may be connected to a second side of the connector so as to communicate with the main duct.

The connecting duct may be formed in a bellows shape by combining a plurality of annular films together.

Of the plurality of annular films forming the connecting duct, a film disposed at the first end of the connecting duct may be a fixed film that is fixed to the second side of the connector or may be formed with the connector by insert injection molding.

The ventilation apparatus may further include a flow path cover provided with a cover hole communicating with a flow path provided in the seat pad, and attached to a surface of the seat pad facing the seat frame, wherein, of the plurality of annular films forming the connecting duct, a film disposed at the second end of the connecting duct may be an adhered film that is adhered to an inner surface of the flow path cover by being inserted though the cover hole of the flow path cover.

The connecting duct may be manufactured by combining a plurality of kinds of films, and an outer diameter of wrinkles formed by films positioned at opposite end portions of the connecting duct may be configured to be smaller than an outer diameter of a wrinkle formed by films positioned at a middle portion of the connecting duct.

The connecting duct may include: a first wrinkle formed by combining a pair of annular first films together; a second wrinkle connected to each of opposite ends of the first wrinkle at a first end thereof, and formed by combining a pair of annular second films having an outer diameter smaller than an outer diameter of the first film together; and a third wrinkle connected to a second end of the second wrinkle at a first end thereof, and formed by combining a pair of annular third films having an outer diameter smaller than the outer diameter of the second film together.

Inner diameters of the first film, the second film, and the third film forming the connecting duct may be equal to each other.

The ventilation apparatus may further include: a flow path cover provided with a cover hole communicating with a flow path provided in the seat pad and a plurality of coupling holes along a perimeter of the cover hole, and attached to a surface of the seat pad facing the seat frame; and annular cover films disposed at opposite sides of the flow path cover, respectively, wherein the second end of the connecting duct and the cover films may be layered to each other and integrally coupled together through the coupling hole prior to being fixed to the flow path cover.

The ventilation apparatus may further include an auxiliary connector coupled to the first end of the connecting duct and fixed to the connector, wherein the films forming the connecting duct may include a plurality of connecting films having same outer diameter and same inner diameter, and a combining film being connected to the second end of the connecting duct and having an inner diameter smaller than the inner diameter of the connecting film, the connecting film coupled to the first end of the connecting duct may be coupled to the auxiliary connector, and the combining film may be coupled to the cover film and fixed to the flow path cover.

The outer diameter of the connecting film may be configured to be larger than a diameter of the cover hole of the flow path cover.

The connecting duct may be manufactured by fusion bonding a plurality of laminated films, wherein an inner diameter portion of one film may be fused with an inner diameter portion of another film adjacent to the one film in a first side direction, and an outer diameter portion of the one film may be fused with an outer diameter portion of another film adjacent to the one film in a second side direction, so the connecting duct is formed in a bellows shape.

Meanwhile, a variable type ventilation seat includes: a seat frame; a seat pad supported by the seat frame; an air cushion provided between the seat frame and the seat pad to change a spacing distance between the seat frame and the seat pad; a main duct configured such that a first end thereof is connected to a blower and a second end thereof is coupled to the seat frame so as to allow air to flow therebetween; and a connecting duct configured such that a first end thereof is connected to the second end of the main duct and a second end thereof is connected to the seat pad, and formed in a bellows shape having a variable length so as to allow air to flow between the seat frame and the seat pad even if the spacing distance between the seat frame and the seat pad is changed.

According to the ventilation apparatus for a seat of a vehicle and the variable type ventilation seat using the same, the present disclosure has the following effects.

First, it is possible to reduce the entire thickness of the seat by reducing a gap between the seat frame and the seat pad.

Second, the connecting structure between the duct and the seat pad is simplified, so it is possible to simplify assembly process.

Third, even if a gap between the seat frame and the seat pad is changed, it is possible to maintain sealing therebetween by preventing air leakage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
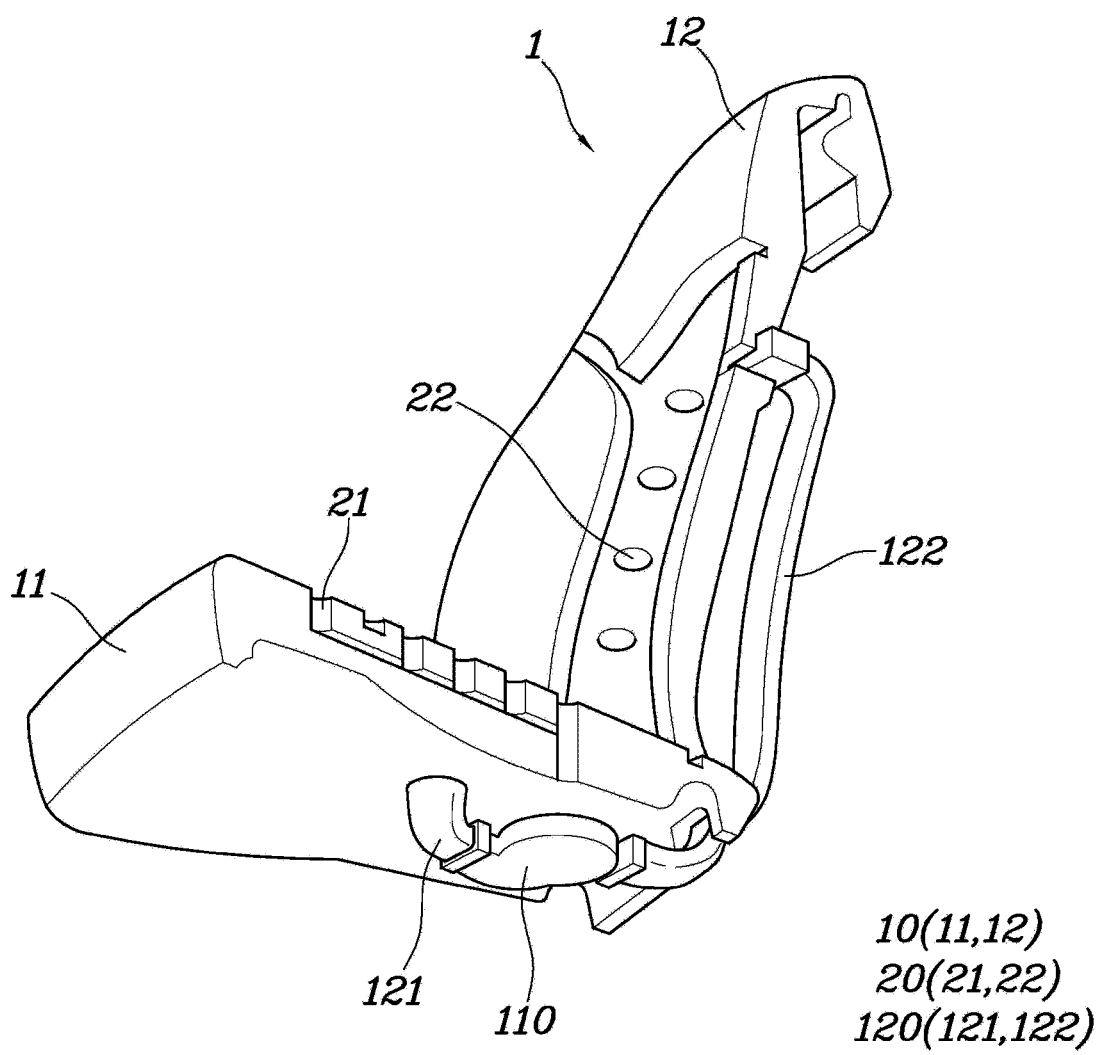
FIG. 1 is a view showing an entire appearance of a ventilation seat according to a variation of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular variations only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, a ventilation apparatus for a seat of a vehicle and a variable type ventilation seat using the same according to an exemplary variation of the present disclosure will be described in detail with reference to the accompanying drawings.

Figure 2:
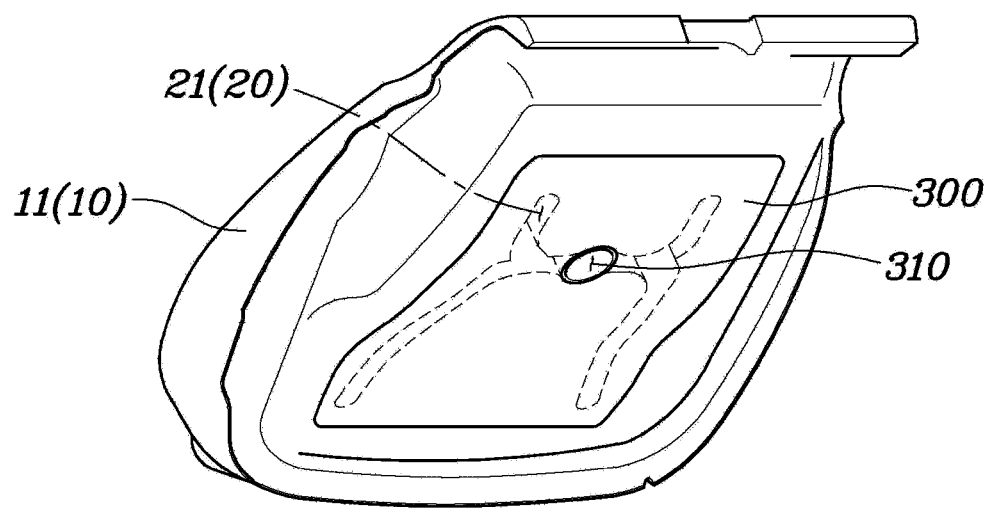
FIG. 2 is a view showing a flow path cover closing a flow path formed in a seat pad.
Figure 3:
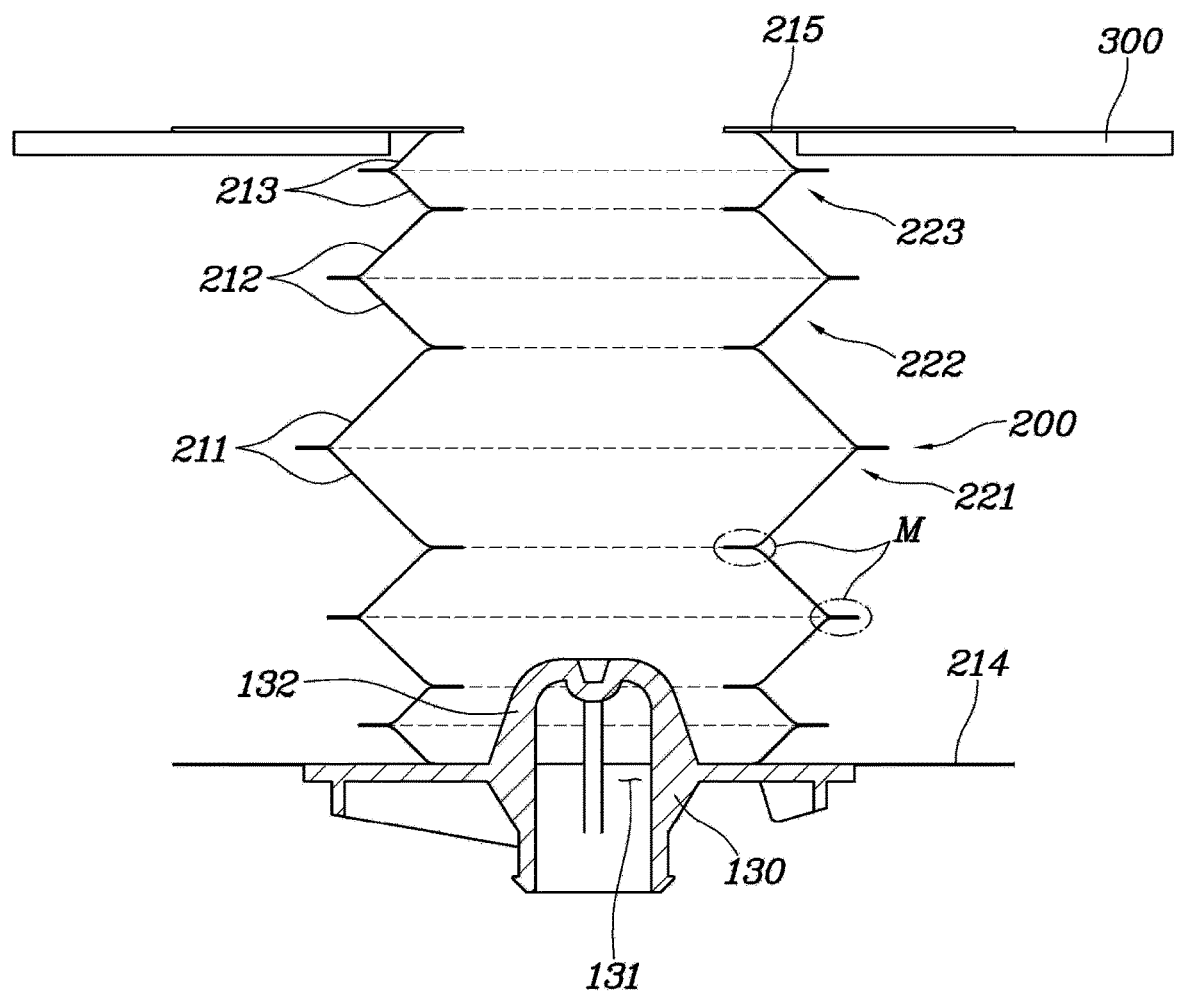
FIG. 3 is a view showing a connecting duct according to a variation of the present disclosure.
Figure 4:
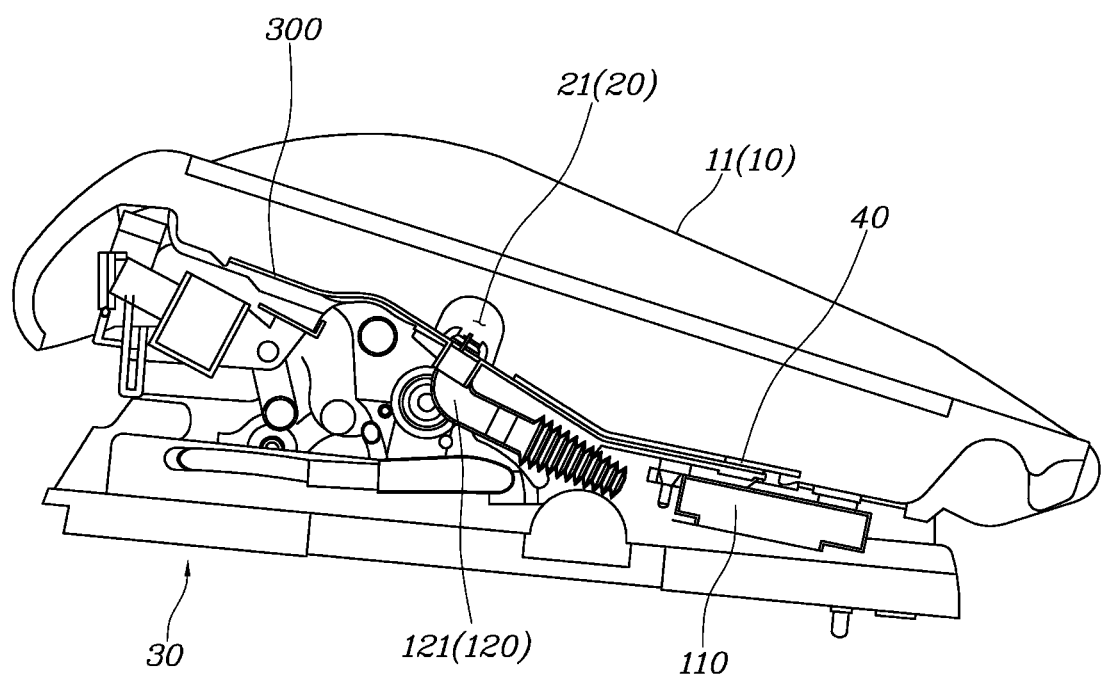
FIGS. 4 and 5 are views showing change in length of the connecting duct as a gap between the seat pad and a seat frame is adjusted.
Figure 5:
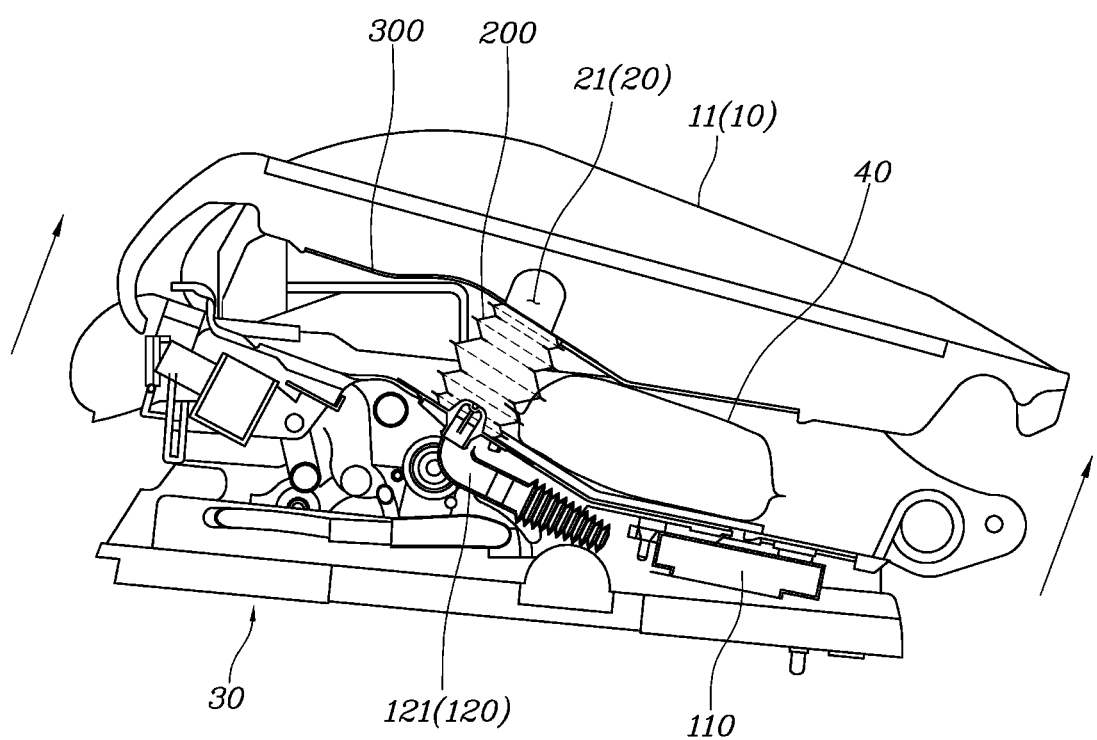

First, a ventilation apparatus for a seat of a vehicle will be described. FIG. 1 shows an entire appearance of a ventilation seat 1 and a main duct 120 connecting a blower 110 and a seat pad 10; FIG. 2 shows a flow path cover 300 covering a flow path 20 formed in the seat pad 10; FIG. 3 shows a connecting structure between an end of the main duct 120 and the seat pad 10 in the ventilation apparatus according to the present disclosure; and FIGS. 4 and 5 show change in length of a connecting duct 200 as a gap between the seat pad 10 and a seat frame 30 is adjusted. Here, although not shown in FIGS. 1 to 3, a seat frame 30 is provided in a seat cushion 11 at a position opposite to the direction in which an occupant sits.

The seat pad 10 includes the seat cushion 11 supporting the occupant's buttocks, and a seat back 12 supporting the occupant's back; and the main duct 120 includes a first duct 121 provided between the blower 110 and the seat cushion 11, and a second duct 122 provided between the blower 110 and the seat back 12.

The ventilation apparatus according to the present disclosure is capable of allowing air to flow by being connected to a first flow path 21 formed in the seat cushion 11 and a second flow path 22 formed in the seat back 12, but for convenience of explanation, a description will be made using a drawing of the ventilation apparatus connected to the first flow path 21 of the seat cushion 11. Of course, the same structure may be connected to the second flow path 22 of the seat back 12.

As shown in FIGS. 1 to 5, the ventilation apparatus according to the present disclosure includes: the main duct 120 configured such that a first end thereof is connected to the blower 110 and a second end thereof is coupled to the seat frame 30 so as to allow air to flow therebetween; and the connecting duct 200 configured such that a first end thereof is connected to the second end of the main duct 120 and a second end thereof is connected to the seat pad 10, and formed in a bellows shape having a variable length so as to allow air to flow between the seat frame 30 and the seat pad 10 even if a spacing distance between the seat frame 30 and the seat pad 10 is changed.

Herein, it is preferable that the ventilation apparatus further includes a connector 130 provided in the second end of the main duct 120 to fix the main duct 120 to the seat frame 30.

The main duct 120, which is a pipe forming a kind of flow path for supplying air or sucking air by being connected to the blower 110, is a configuration connecting the blower 110 and the seat pad 10. The blower 110 and the main duct 120 are coupled to the seat frame 30 and fixed in position, and are moved along with the seat frame when the seat frame 30 is moved as the seat 1 is changed in shape or position.

The connecting duct 200 is a core configuration of the present disclosure, in which the first end thereof is connected to the second end of the main duct 120 and the second end thereof is connected to the seat pad 10.

Here, the connecting duct 200 is formed in a bellows shape formed of a thin film, and the length thereof is variable when the spacing distance between the seat frame 30 and the seat pad 10 is changed, thereby forming a flow path the seat frame 30 and the seat pad 10 to prevent air leakage Since the connector 130 is fixed to the seat frame 30 by mediating between the second end of the main duct 120 and the first end of the connecting duct 200, the first end of the connecting duct 200 maintains a constant distance relative to the seat frame 30.

The connector 130 may be configured such that a central portion thereof is formed with a through-hole 131 to communicate the main duct 120 and the connecting duct 200 forming a flow path, and a peripheral portion thereof is provided with a structure to be coupled to the seat frame 30. For example, the peripheral portion may be formed with a bolt hole for bolting the seat frame 30 and the connector 130 together, or with a welded portion welded to the seat frame 30 when the connector 130 is formed of a metal material.

Based on the through-hole 131 of the connector 130, the second end of the main duct 120 is connected to a first side of the connector 130, and the first end of the connecting duct 200 is connected to a second side of the connector 130. Here, it is preferable that the connector 130 and the main duct 120 are connected by a mechanical fastening structure such as bolting or fitting, and the connector 130 and the connecting duct 200 are integrated by a method such as adhesion, fusion, insert injection molding, and the like. A detailed method of coupling the connector 130 and the connecting duct 200 will be described later.

The second side of the connector 130 is provided with a guide 132, wherein the guide 132 serves to guide the compression direction of the connecting duct 200 in order to inhibit the connecting duct 200 from being bent or separated when compressed. However, the guide 132 is not an essential component and may be omitted as needed.

The connecting duct 200 is preferably formed in a bellows shape by layering a plurality of ring-shaped films 210 and connecting them together. As a result, the wrinkles of the connecting duct 200 can have a very thin thickness during compression and a high rate of change in length during stretching. Here, the film 210 is preferably formed of a material such as TPU (thermoplastic polyurethane) capable of fusion bonding.

It is preferable that the films 210 forming the connecting duct 200 are bonded to each other by ultrasonic welding to be manufactured in a bellows shape. Ultrasonic welding has advantages of short process time, strong bonding force, easy bonding at multiple positions, and neat bonding area. Further, ultrasonic welding does not require layers made of an adhesive so that thin films can be bonded to have a very thin thickness when bonding the thin films.

Here, based on any one of the plurality of films 210, the inner diameter portion of this film 210 is fused with the inner diameter portion of another film 210 adjacent to the film 210 in the first side direction to form a fused portion M, and the outer diameter portion thereof is fused with the outer diameter portion of another film 210 adjacent to the film 210 in the second side direction to form a fused portion M, so that the plurality of films is formed in a bellows shape.

In other words, when combining the plurality of films 210, the inner diameter portion and the outer diameter portion are alternately fused and connected in a zigzag shape to form a bellows shape having a variable length.

Meanwhile, the flow path 20 is formed inside the seat pad 10, and the flow path 20 communicates with the blower 110, thereby forming a path through which the air flows by the blower 110 moves. The flow path 20 extends to the outer surface of the seat in contact with the occupant so that sweat generated in the buttocks or back of the occupant can be cooled using the air flow generated by the blower 110.

Meanwhile, it is preferable that the ventilation apparatus according to the present disclosure further includes the flow path cover 300 provided at the lower surface of the seat pad 10, more specifically, at the surface facing the seat frame 30. The flow path cover 300 is formed in a plate or cover shape that closes the flow path 20 formed in the seat pad 10, and a cover hole 310 communicating with the flow path 20 is formed in the central portion of the flow path cover. As will be described below, the shape of the flow path cover 300 may vary depending on the variation of the connecting duct 200.

The specific shape of the connecting duct 200 according to the present disclosure may have several variations, and a first variation will be described first.

The connecting duct 200 is formed in a bellows shape constituted by the plurality of films 210, and it is preferable that the film 210 disposed at the first end of the connecting duct is a fixed film 214 fixed to the second side of the connector 130 or formed with the connector by insert injection molding.

In other words, the fixed film 214 may be thermally fused to the surface of the connector 130 to be integrated with the connector 130, or with the fixed film 214 disposed in a mold, the connector 130 may be insert-injection molded such that the fixed film 214 and the connector 130 are integrally formed.

As a result, not only the bonding force between the connector 130 and the connecting duct 200 can be improved, but also the joint between the connector 130 and the connecting duct 200 is completely sealed, thereby fundamentally preventing air leakage.

Of the films 210 constituting the connecting duct 200, the film disposed at the second end of the connecting duct 200 may be an adhered film 215 to be integrated with flow path cover 300.

Here, an adhesive is applied onto the inner surface of the flow path cover 300, that is, the surface facing the seat pad 10, so that the flow path cover 300 can be adhered to the seat pad 10.

The adhered film 215 is inserted through the cover hole 310 of the flow path cover 300, and the adhered film 215 is adhered to the adhesive applied onto the inner surface of the flow path cover 300, thereby bonding the adhered film 215 and the flow path cover 300 together.

Figure 6:
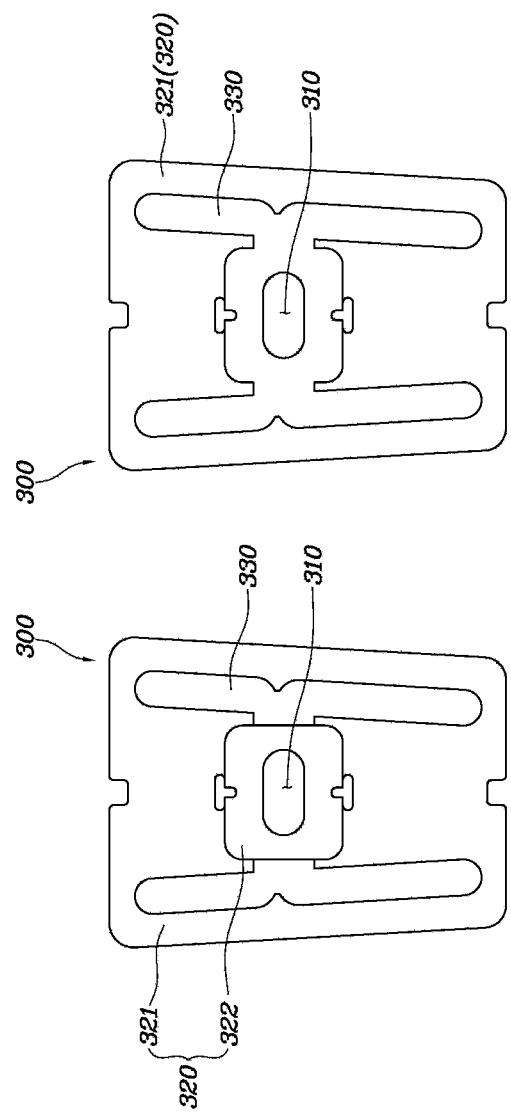
FIGS. 6A and 6B are views showing an inner surface of the flow path cover.

FIGS. 6A and 6B show the shape of the inner surface of the flow path cover 300.

As shown in FIGS. 2 to 6B, of the inner surface of the flow path cover 300, a non-bonding portion 330 is provided at a position in contact with the flow path 20, and an adhesive is not applied onto the non-bonding portion 330.

At the remaining positions of the inner surface of the flow path cover 300 except the non-bonding portion 330, a bonding portion 320 is provided, and an adhesive is applied onto the bonding portion, so that the bonding portion can be bonded to the seat pad 10 by the adhesive. Here, the bonding portion 320 may be divided into a pad bonding portion 321 and a duct bonding portion 322, wherein the pad bonding portion 321 is a portion with which the seat pad 10 is bonded, and the duct bonding portion 322 is a portion with which the connecting duct 200 is bonded. To be more specific, the adhered film 215 connected to the second end of the connecting duct 200 by being inserted through the cover hole 310 may be bonded to the duct bonding portion 322.

As shown in FIG. 6A, when the duct bonding portion 322 is formed, the adhered film 215 can be adhered to the duct bonding portion, but when the second variation of the connecting duct 200 is applied or the bellows shaped connecting duct 200 is not required, there is no need to form the duct bonding portion 322. Accordingly, in this case, as shown in FIG. 6B, by removing the duct bonding portion 322, the flow path cover 300 in a shape that the non-bonding portion 330 extends to a perimeter of the cover hole 310 may be used.

As such, the adhered film 215 is combined to the duct bonding portion 322 formed on the inner surface of the flow path cover 300, so that the connecting duct 200 and the flow path cover 300 can be securely coupled together, thereby preventing air leakage.

There are various types of film 210 constituting the connecting duct 200, and a diameter of a wrinkle 220 may be formed differently according to a position. For example, an outer diameter of a wrinkle 220 positioned at a middle portion of the connecting duct may be configured to be larger, and an outer diameter of wrinkles 220 positioned at opposite ends of the connecting duct may be configured to be smaller, such that an outer diameter is different according to a position. Here, the inner diameter of each wrinkle 220 must be kept constant to reduce resistance when air flows.

To be specific, a first wrinkle 221 is formed at the middle portion of the connecting duct 200 by combining a pair of annular first films 211 together; a second wrinkle 222 is connected to each of opposite ends of the first wrinkle 221, and formed by combining a pair of annular second films 212 having an outer diameter smaller than that of the first film 211 together; and a third wrinkle 223 is connected to an end of the second wrinkle 222, with which the first wrinkle 221 is not connected, and formed by combining a pair of annular third films 213 having an outer diameter smaller than that of the second film 212 together.

Since the inner diameters of the first film 211, the second film 212, and the third film 213 are equal to each other, the inner diameters of the first wrinkle 221, the second wrinkle 222, and the third wrinkle 223 are also equal to each other.

By using a plurality of kinds of films 210 whose outer diameters are different from each other, when the outer diameter portion of each film 210 is ultrasonically welded, the respective films 210 can be fused simultaneously. This can improve the productivity in manufacturing the connecting duct 200, and inhibit the overlapping of the fused portions M between the films 210 during the compression of the connecting duct 200 to further reduce the thickness.

Although the wrinkle 220 is divided into three types according to a form of the present disclosure, the present disclosure is not limited thereto, and the types of the wrinkle 220 may be increased or decreased in consideration of the coupling relation with the peripheral components.

As such, by connecting the first end of the connecting duct 200 to the connector 130 and connecting the second end thereof to the flow path cover 300, the blower 110 and the seat pad 10 are connected together, and it is possible to allow air to flow even if a gap between the seat frame 30 and the seat pad 10 is changed. As a result, the wind generated from the blower 110 is transferred to the seat pad 10 or the blower 110 sucks air from the seat pad 10 to enhance occupant comfort.

Next, a second variation of the connecting duct 200 according to the present disclosure will be described, hereinafter.

Figure 7:
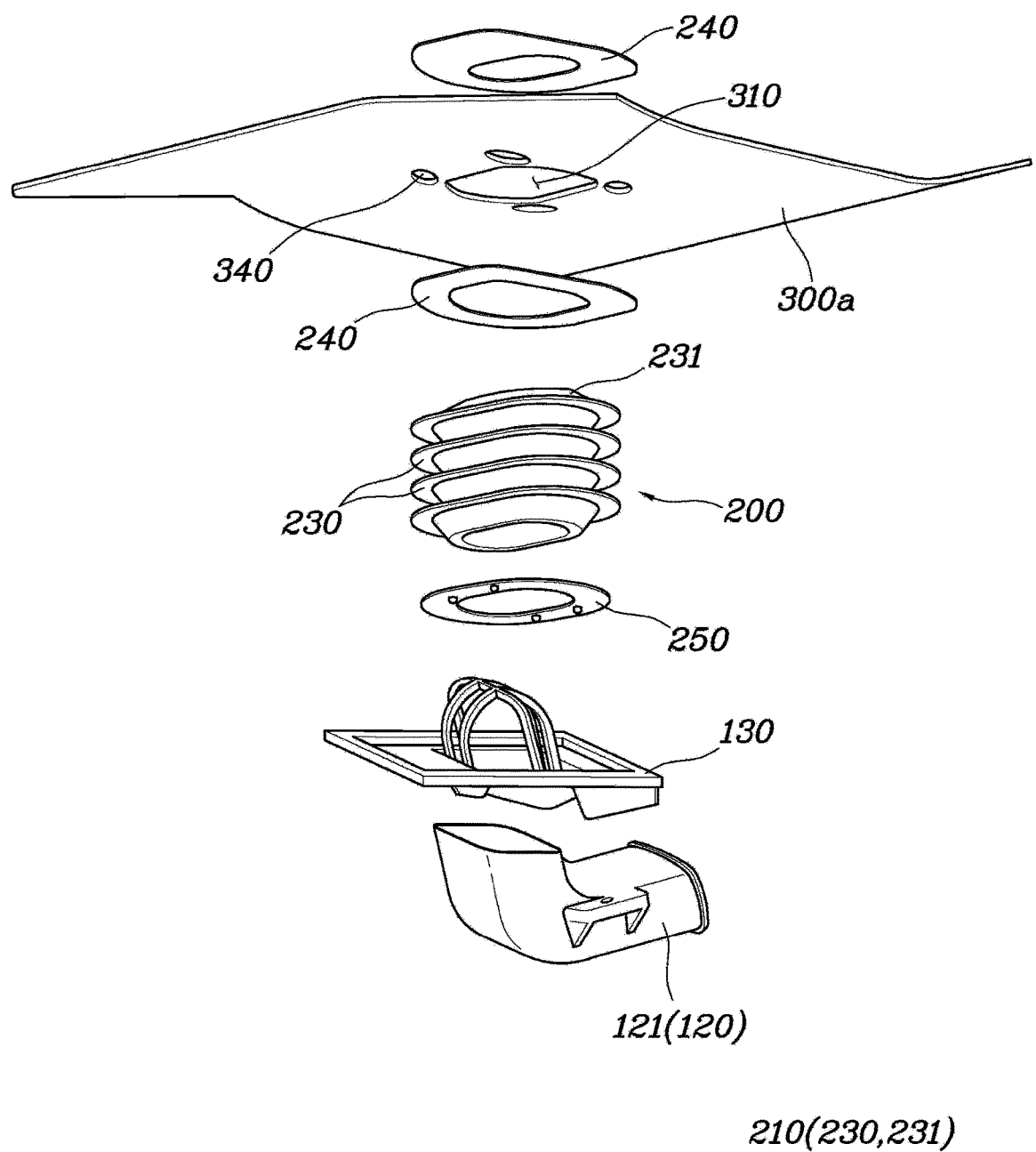
FIGS. 7 and 8 are views showing the connecting duct according to another variation of the present disclosure.
Figure 8:
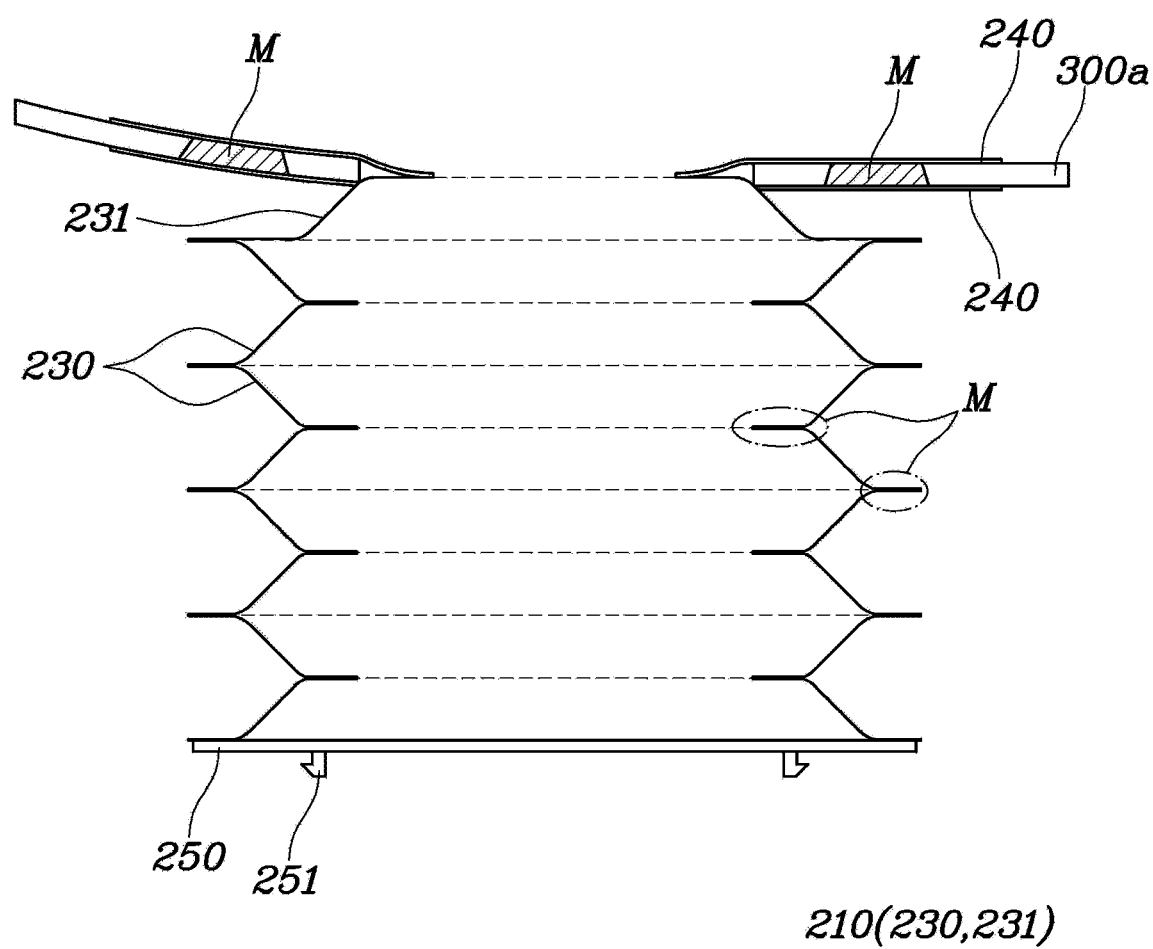
Figure 9:
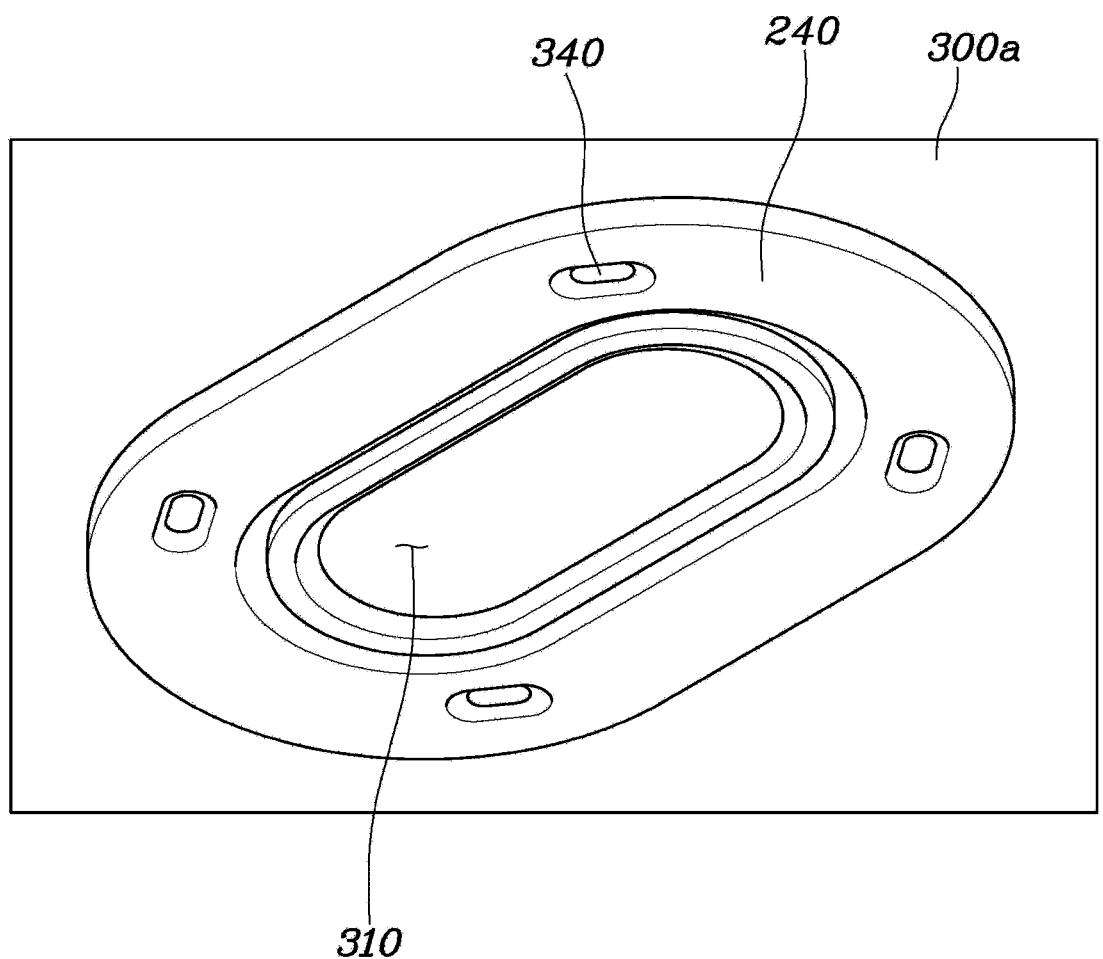
FIG. 9 is a view showing a state where a cover film is coupled to the flow path cover.
Figure 10:
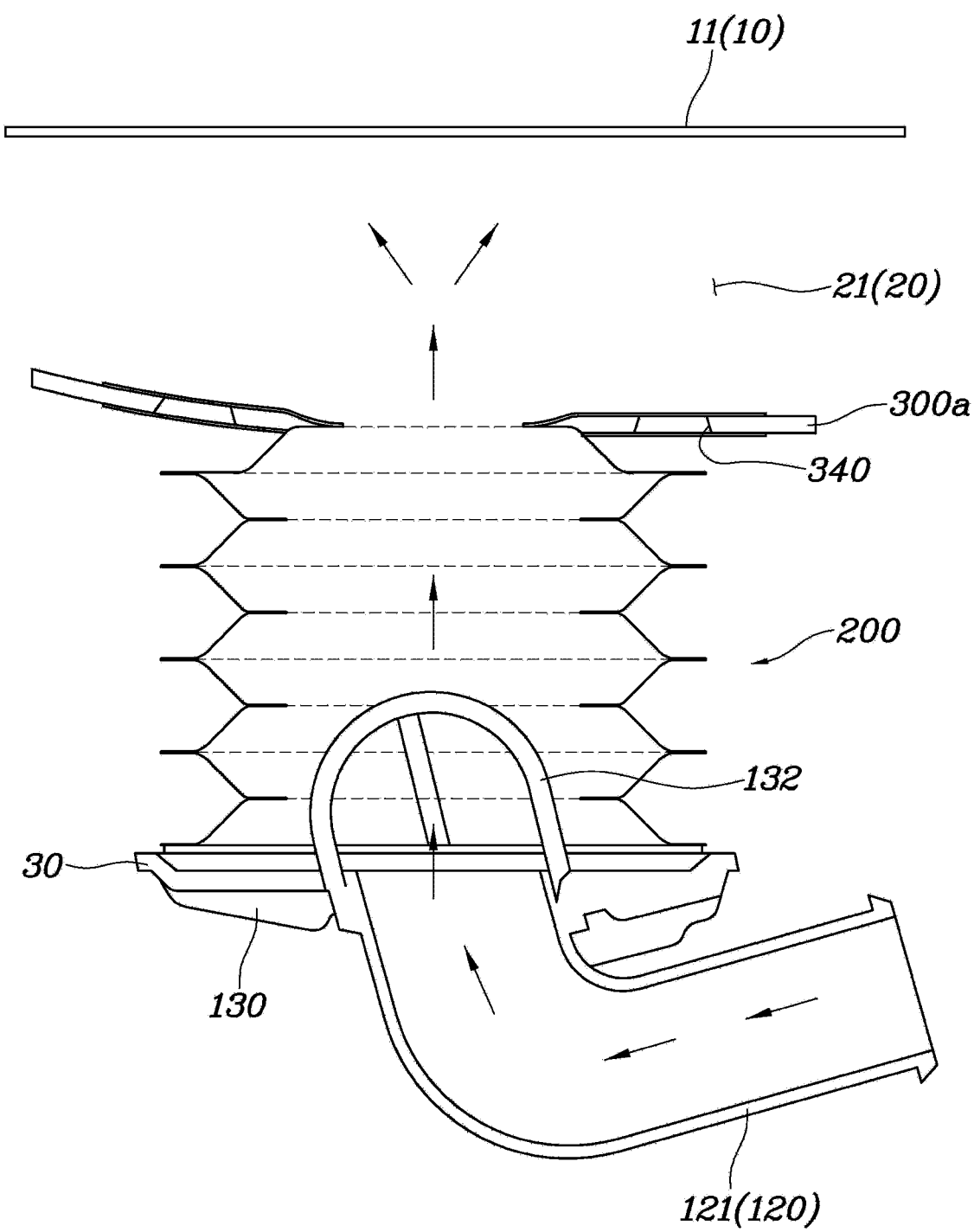
FIG. 10 is a view showing a path along which air is transferred to the flow path inside the seat pad through a main duct.

FIG. 7 is an exploded view showing a coupling relationship between the main duct 120 and a flow path cover 300*a* on a seat pad 10 side when the second variation of the connecting duct 200 is applied; FIG. 8 is a sectional view showing the connecting duct 200; FIG. 9 is a view showing a state where a cover film 240 is combined to the flow path cover 300*a*; and FIG. 10 is a view showing a path along which air is transferred to the flow path 20 inside the seat pad 10 through the main duct 120.

In the first variation, the connecting duct 200 is configured using a plurality of kinds of films 210 having different sizes; however, as shown in FIGS. 7 to 10, the connecting duct 200 according to the second variation is formed in a bellows shape by connecting a plurality of annular connecting films 230 having the same size.

When the connecting duct 200 according to the second variation is applied, the flow path cover 300*a* having the cover hole 310 and a coupling hole 340 is coupled to the seat pad 10, the annular cover film 240 is disposed on each of the opposite sides of the flow path cover 300*a*, so a pair of cover films 240 are combined together through the coupling hole 340, and the second end of the connecting duct 200 is integrally formed with the cover film 240, thereby connecting the connecting duct 200 and the flow path cover 300*a* together.

In the first variation, the flow path cover 300 is formed with only the cover hole 310. However, in the second variation, the flow path cover 300*a* is further formed with the coupling hole 340 as well as the cover hole 310.

It is preferable that a plurality of coupling holes 340 are formed along a perimeter of the cover hole 310, and the plurality of the coupling holes are radially arranged by being spaced from the cover hole 310 by a predetermined distance.

The coupling holes 340 serve as a kind of passage for coupling the cover films 240 disposed on opposite sides of the flow path cover 300a together.

Although the coupling hole 340 may be filled with a separate adhesive to couple the pair of cover films 240, it is more preferable to integrate the cover films 240 by heat or ultrasonic welding.

Here, the second end of the connecting duct 200 is integrally fused together with the cover films 240 so that the connecting duct 200 and the flow path cover 300a can be integrally combined together.

The first end of the connecting duct 200 may be connected with an auxiliary connector 250 that is integrally fused with the film forming the connecting duct 200. The auxiliary connector 250 is preferably formed of a plastic material capable of fusion bonding, and the lower surface of the auxiliary connector is preferably formed with a fastening protrusion 251 so as to be engaged with the connector 130 provided at the second end of the main duct 120. Here, the upper surface of the connector 130 is formed with a fastening groove that is engaged with the fastening protrusion 251 of the auxiliary connector 250.

A connecting film 230 coupled at the first end of the connecting duct 200 is integrally coupled to the auxiliary connector 250, and preferably, coupled by fusion bonding.

Further, the second end of the connecting duct 200 may be coupled with a combining film 231 that is integrally fused with the cover film 240. Here, the combining film 231 may be provided as an annular film having an inner diameter smaller than that of the connecting film 230. The reason why the inner diameter of the combining film 231 is configured to be small is to allow the upper surface of the combining film 231 to be inserted into the cover hole 310 of the flow path cover 300a and fused with the cover film 240.

It is preferable that the outer diameter of the connecting film 230 is configured to be larger than the diameter of the cover hole 310 of the flow path cover 300a. This inhibits the bellows formed by the connecting films 230 from entering inside the cover hole 310.

As such, even if the connecting duct 200 according to the second variation is used, as in the first variation, it is possible to connect the blower 110 to the seat pad 10, and allow air to flow therebetween even if the gap between the seat frame 30 and the seat pad 10 is changed.

Next, a variable type ventilation seat according to the present disclosure will be described, hereinafter.

As shown in FIGS. 1, 4, and 5, the seat 1 according to the present disclosure may include: a seat frame 30 coupled to the seat itself; a seat pad 10 supported by the seat frame 30; an air cushion 40 provided between the seat frame 30 and the seat pad 10 to change a gap between the seat frame 30 and the seat pad 10; a main duct 120 connected to a blower 110 and fixed to the seat frame 30; and a connecting duct 200 communicating with blower 110 by mediating between the main duct 120 and the seat pad 10.

The seat frame 30 is coupled to a vehicle body, is movably provided in the front-back direction and the right-left direction of a vehicle, and supports the seat pad 10.

The air cushion 40 is a configuration for adjusting the height of the seat pad 10 supported by the seat frame 30, and more precisely, is a configuration for changing the gap between the seat frame 30 and the seat pad 10.

In other words, as shown in FIG. 4, the gap between the seat frame 30 and the seat pad 10 is reduced when air is pulled out of the air cushion 40, and as shown in FIG. 5, the gap between the seat frame 30 and the seat pad 10 is increased when air is supplied to the air cushion 40.

The reason of changing the gap between the seat frame 30 and the seat pad 10 is to adjust the height of the seat pad 10 or to change a relative angle between the seat pad 10 and the seat frame 30. This can be provided as a convenience function that allows the occupant to sit in an optimum posture.

Since the gap between the seat frame 30 and the seat pad 10 is variable according to the operation of the air cushion 40, the connecting duct 200 having a variable length is used to maintain sealing therebetween, as in the above described ventilation apparatus. Further, since the thickness of the film 210 constituting the connecting duct 200 is thinner than that of the rubber, the compressed length of the connecting duct 200 can be reduced when the air is pulled out of the air cushion 40.

The structure of the flow path 20 inside the seat pad 10 and the connecting structure from the blower 110 to the main duct 120 and the connecting duct 200 are replaced with description of the ventilation apparatus described above, so the description thereof will be omitted here.

Although the present disclosure is described with reference to specific items such as specific structural elements, to merely some variations, and to drawings, such specific details disclosed herein are merely representative for purposes of helping more comprehensive understanding of the present disclosure. The present disclosure, however, is not limited to only the example forms set forth herein, and those skilled in the art will appreciate that the present disclosure can be embodied in many alternate forms.

Accordingly, the present disclosure is intended to cover not only the exemplary embodiments, but also various alternatives, modifications, equivalents and other embodiments that may be included within the spirit and scope of the present disclosure as defined by the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A ventilation apparatus for a seat of a vehicle, the ventilation apparatus comprising:
   a main duct configured such that a first end thereof is connected to a blower and a second end thereof is coupled to a seat frame so as to allow air to flow therebetween; and
   a connecting duct configured such that a first end thereof is connected to the second end of the main duct and a second end thereof is connected to a seat pad, and formed in a bellows shape having a variable length so as to allow air to flow between the seat frame and the seat pad even if a spacing distance between the seat frame and the seat pad is changed, wherein the connecting duct is formed in a bellows shape by combining a plurality of annular films together.

2. The ventilation apparatus of claim 1, further comprising:
a connector configured such that a central portion thereof is formed with a through-hole, a peripheral portion thereof is coupled to the seat frame, and a first side thereof is fastened with the second end of the main duct such that the main duct is fastened to the seat frame,
wherein the first end of the connecting duct is connected to a second side of the connector so as to communicate with the main duct.

3. The ventilation apparatus of claim 2, wherein the connecting duct is manufactured by fusion bonding a plurality of laminated films, wherein an inner diameter portion of one film is fused with an inner diameter portion of another film adjacent to the one film in a first side direction, and an outer diameter portion of the one film is fused with an outer diameter portion of another film adjacent to the one film in a second side direction, so the connecting duct is formed in a bellows shape.

4. The ventilation apparatus of claim 1, wherein, of the plurality of annular films forming the connecting duct, a film disposed at the first end of the connecting duct is a fixed film that is fixed to the second side of the connector or is formed with the connector by insert injection molding.

5. The ventilation apparatus of claim 1, further comprising:
a flow path cover provided with a cover hole communicating with a flow path provided in the seat pad, and attached to a surface of the seat pad facing the seat frame,
wherein, of the plurality of annular films forming the connecting duct, a film disposed at the second end of the connecting duct is an adhered film that is adhered to an inner surface of the flow path cover by being inserted though the cover hole of the flow path cover.

6. The ventilation apparatus of claim 1, wherein the connecting duct is manufactured by combining a plurality of kinds of films, and an outer diameter of wrinkles formed by films positioned at opposite end portions of the connecting duct is configured to be smaller than an outer diameter of a wrinkle formed by films positioned at a middle portion of the connecting duct.

7. The ventilation apparatus of claim 6, wherein the connecting duct includes:
a first wrinkle formed by combining a pair of annular first films together;
a second wrinkle connected to each of opposite ends of the first wrinkle at a first end thereof, and formed by combining a pair of annular second films having an outer diameter smaller than an outer diameter of the first films together; and
a third wrinkle connected to a second end of the second wrinkle at a first end thereof, and formed by combining a pair of annular third films having an outer diameter smaller than the outer diameter of the second films together.

8. The ventilation apparatus of claim 7, wherein inner diameters of one of the first films, one of the second films, and one of the third films forming the connecting duct are equal to each other.

9. The ventilation apparatus of claim 1, further comprising:
a flow path cover provided with a cover hole communicating with a flow path provided in the seat pad and a plurality of coupling holes along a perimeter of the cover hole, and attached to a surface of the seat pad facing the seat frame; and
annular cover films disposed at opposite sides of the flow path cover, respectively,
wherein the second end of the connecting duct and the cover films are layered to each other and integrally coupled together through the coupling hole prior to being fixed to the flow path cover.

10. The ventilation apparatus of claim 9, further comprising:
an auxiliary connector coupled to the first end of the connecting duct and fixed to the connector,
wherein the films forming the connecting duct includes a plurality of connecting films having the same outer diameter and the same inner diameter, and a combining film being connected to the second end of the connecting duct and having an inner diameter smaller than the inner diameter of the connecting film,
the connecting film coupled to the first end of the connecting duct is coupled to the auxiliary connector, and
the combining film is coupled to the cover film and fixed to the flow path cover.

11. The ventilation apparatus of claim 10, wherein the outer diameter of the connecting film is configured to be larger than a diameter of the cover hole of the flow path cover.

12. A variable type ventilation seat comprising:
a seat frame;
a seat pad supported by the seat frame;
an air cushion provided between the seat frame and the seat pad to change a spacing distance between the seat frame and the seat pad;
a main duct configured such that a first end thereof is connected to a blower and a second end thereof is coupled to the seat frame so as to allow air to flow therebetween; and
a connecting duct configured such that a first end thereof is connected to the second end of the main duct and a second end thereof is connected to the seat pad, and formed in a bellows shape having a variable length so as to allow air to flow between the seat frame and the seat pad even if the spacing distance between the seat frame and the seat pad is changed, wherein the connecting duct is formed in a bellows shape by combining a plurality of annular films together.

* * * * *